US008621074B2

(12) United States Patent
Shikari et al.

(10) Patent No.: US 8,621,074 B2
(45) Date of Patent: Dec. 31, 2013

(54) INTELLIGENT WORK LOAD MANAGER

(75) Inventors: Faiyaz Shikari, Cumming, GA (US);
Madhav Matta, Alpharetta, GA (US);
Suresh Venkatesan, Mylapore, IN (US)

(73) Assignee: Xerox Business Services, LLC, Dallas, TX (US)

( * ) Notice: Subject to any disclaimer, the term of this patent is extended or adjusted under 35 U.S.C. 154(b) by 91 days.

(21) Appl. No.: 13/458,327

(22) Filed: Apr. 27, 2012

(65) Prior Publication Data

US 2013/0290513 A1    Oct. 31, 2013

(51) Int. Cl.
*G06F 15/173*    (2006.01)

(52) U.S. Cl.
USPC ............ 709/224; 709/220; 709/226; 710/74; 710/33; 711/114

(58) Field of Classification Search
USPC ........ 709/224, 220, 226; 710/74, 33; 711/114
See application file for complete search history.

(56) References Cited

U.S. PATENT DOCUMENTS

| 6,078,990 | A | * | 6/2000 | Frazier | 711/114 |
| 6,081,812 | A | * | 6/2000 | Boggs et al. | 1/1 |
| 6,105,122 | A | * | 8/2000 | Muller et al. | 712/1 |
| 6,148,349 | A | * | 11/2000 | Chow et al. | 710/33 |
| 6,247,077 | B1 | * | 6/2001 | Muller et al. | 710/74 |
| 6,256,740 | B1 | * | 7/2001 | Muller et al. | 726/12 |
| 6,594,698 | B1 | * | 7/2003 | Chow et al. | 709/226 |
| 6,711,632 | B1 | * | 3/2004 | Chow et al. | 710/29 |
| 8,103,683 | B2 | | 1/2012 | Koya et al. | |
| 8,374,894 | B2 | * | 2/2013 | Weinstock et al. | 705/5 |
| 2007/0087756 | A1 | * | 4/2007 | Hoffberg | 455/450 |

* cited by examiner

*Primary Examiner* — Tammy Nguyen
(74) *Attorney, Agent, or Firm* — Conley Rose, P.C.; Grant Rodolph; Nicholas K. Beaulieu

(57) ABSTRACT

A management system for processing message-based communications comprising a plurality of servers configured to implement a plurality of sessions that process a plurality of messages, a plurality of message queues coupled to the servers and configured to exchange the messages with the servers, and a workload manager coupled to the servers and the message queues and configured to reallocate the sessions to the different servers and the corresponding message queues to achieve load balance between the servers and the message queues in a recurring manner during processing of the messages by the servers based on a depth of each of the message queues, a quantity of sessions for each of the servers, and a workload manager configuration.

13 Claims, 7 Drawing Sheets

INTELLIGENT WORK LOAD MANAGER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Business enterprises typically include computer systems, such as mainframe and personal computer networks, that comprise application servers and queues for handling message requests. Such servers and queues, also referred to as message queues, typically receive, process, and forward requests for information and services. Message queuing is a method of application-to-application communication, such as communications between an application that services a user and an application that retrieves data from a database. Applications may communicate by writing and reading application-specific data or messages to and from queues without having a dedicated synchronous link between the applications. An application server is a run time process that hosts an application and provides a communication channel for the application running on the application server to communicate with a message queue. Messaging means that applications communicate with each other by sending discrete amounts of data in messages to some intermediary, and not necessarily by calling each other directly. Queuing implies that applications communicate through queues, which removes the requirement for sending applications and receiving applications to execute concurrently and/or synchronously. A system that uses such application servers and message queues to support and promote applications and services, such as for business enterprises, is referred to herein as a production environment.

SUMMARY

In an embodiment, the disclosure includes a management system for processing message-based communications comprising a plurality of servers configured to implement a plurality of sessions that process a plurality of messages, a plurality of message queues coupled to the servers and configured to exchange the messages with the servers, and a workload manager coupled to the servers and the message queues and configured to reallocate the sessions to the different servers and the corresponding message queues to achieve load balance between the servers and the message queues in a recurring manner during processing of the messages by the servers based on a depth of each of the message queues, a quantity of sessions for each of the servers, and a workload manager configuration.

In another embodiment, the disclosure includes an apparatus comprising a processor configured to monitor at a recurring interval a plurality of message queues and a plurality of server sessions that access the message queues, determine, at each occurrence of the interval, an appropriate number of server sessions per queue that achieves acceptable load balance, and redistribute the server sessions among the servers to match the appropriate number of server session per queue upon determining the appropriate number of server sessions and prior to a subsequent occurrence of the interval.

In yet another embodiment, the disclosure includes an application for healthcare claims management comprising a plurality of instructions that cause a processor to obtain a plurality of parameters including an server list, a message queue list, a plurality of threshold settings, and a monitoring interval, monitor a plurality of servers indicated in the server list and a plurality of message queues coupled to the servers and indicated in the message queue list at each recurring monitoring interval, and reallocate a plurality of sessions implemented on the servers and associated with the message queues based on the quantity of sessions on each of the servers, the depth of each of the message queues, and the threshold settings.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
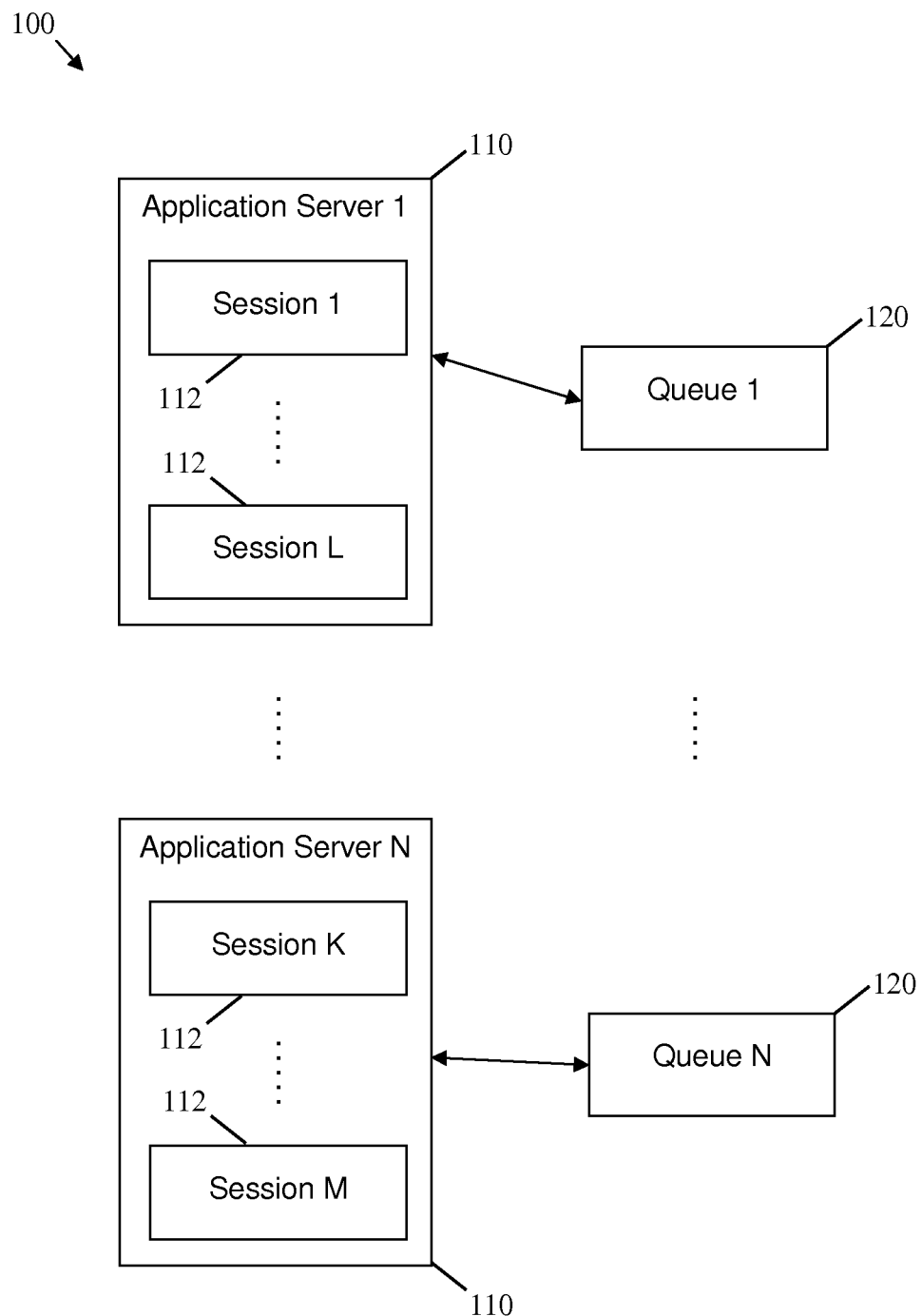
FIG. 1 is a schematic diagram of an embodiment of a production environment system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A message queue system may be implemented using a message queue software, or a message-oriented middleware, and may be located in a network or data center component, such as at a server or other computer component (e.g., a network interface card (NIC)). The message queue system may comprise one or more message queues that store a plurality of messages, and may be managed by a queue manager application. A message queue may be an object, e.g., software based data structure in a memory component, that stores the messages. The message queue may store the messages prior to delivering or transmitting the messages to a receiving component or after receiving the messages from a transmitting component in a network or data center. The messages may comprise collections of binary or character data, e.g., American Standard Code for Information Interchange (ASCII) or Extended Binary Coded Decimal Interchange Code (EBCDIC) characters. The data may be healthcare information data, including insurance claim data, such as medical, dental, vision, and other types of healthcare insurance claims. The healthcare information may also include subscriber and subscriber group information, healthcare provider information, payer information, employer information, or combinations thereof. The data may be interpreted by an application or program and/or used by hardware to implement a function. The messages may also comprise communications protocols, storage, routing, and/or delivery information, which may be added to the messages before transmission and removed from the messages after receiving the messages or prior to delivering the messages to a receiving application.

The data in the message queues may be processed by a plurality of servers that may be located on one or more network components. For example, the servers may be a plurality of processors or NICs located on a single physical box, a plurality of physical servers located in a data center, or a plurality of network nodes distributed in a network. One aspect of the message queue system may be load balancing the processing of the messages in the message queues between the different servers to improve resource utilization and improve overall system efficiency, e.g., in terms of speed and power usage.

In current systems, a static configuration scheme may be used to achieve load balance between multiple application servers that access shared message queues, such as based on a load scenario. For example, a plurality of application servers located on the same physical box may be initially configured to avoid physical resource contention. The static configuration may include setting a maximum allowed number of server application sessions per server. For example, in the International Business Machines (IBM) Websphere application and integration software for creating and integrating applications, a maximum allowed number of Activation Specification sessions, also referred to herein as Activation Specifications, may be set for each server. Setting a maximum allowed number of server application sessions per server may promote initial load balance of sessions among the application servers during load time, and hence achieve initial load balancing in a multi-server system. However, this static configuration approach may not redistribute load between the application servers based on system changes, and thus may not maintain load balance between the different application servers in subsequent operation time, e.g., when some of the application servers become idle or relatively lightly loaded while other application servers remain busy or highly loaded.

Another scheme may be used for modifying the distribution of server application sessions during operation or run time to improve load balance, where the Managed Bean (MBean) application (or class of applications) is used for managing Activation Specifications in the Websphere software. The MBean application is part of the Java Management Extensions (JMX) technology for managing and monitoring applications, which may be implemented using IBM Websphere. However, this scheme typically relies on monitoring the system and associated parameters (e.g., resource parameters) in a manual manner, such as by an administrator, to determine a proper course of action to reconfigure the system. The manual or human intervention approach may not be attractive or applicable in many systems, such as in relatively high-speed communications or control systems that require "real-time" responses (e.g., in less than few seconds) and other systems that need continuous monitoring.

Disclosed herein is a system and method for improving load balance between a plurality of application servers that implement a plurality of sessions, which may access a plurality of message queues. The system and method may implement a workload manager application (software) or component that maintains load balance by redistributing the sessions between the application servers in an effective manner. The sessions may be redistributed in an on-going manner during the application servers' operation time based on the number of sessions handled by each application server, the amount of data in each message queue, also referred to herein as the queue depth, and other related parameters that may be changed if needed. The workload manager may monitor the message queues and the sessions on the application servers and redistribute or manage the sessions in operation time (run time) to guarantee allocating a suitable number of sessions per application server to use physical resources appropriately or optimally. This load balance approach may avoid human error (since the approach does not depend on human intervention) and adapt in a dynamic manner to changes in the system. The present system may be particularly well suited for processing healthcare claims.

FIG. 1 illustrates an embodiment of a production environment system 100 that may be used for a business enterprise or other systems for communicating and processing message-based applications. For instance, the production environment system 100 may correspond to a data center system that handles message-based applications that processes and exchanges message data (in frames or packets) with client systems. Alternatively, the production environment system 100 may correspond to a single component or physical box that communicates with similar or other components, e.g., in a network environment. The production environment system 100 may be part of a healthcare management system that processes healthcare claims in the form of messages or similar communications. For example, the production environment system 100 may be used by a healthcare insurance provider or payer to process insurance claims from healthcare service providers and/or clients (subscribers).

The production environment system 100 may comprise a plurality of servers 110 (labeled server 1 to N, where N is an integer) and a plurality of corresponding message queues 120 (labeled queue 1 to N) that may be coupled to the servers 110. The servers 110 may correspond to physical boxes, such as computer systems in a data center or nodes in a network. Alternatively, the servers 110 may be located on the same physical box, such as multiple processing units in a computer system (or a network component) or multiple NICs in a physical server. In some embodiments, the servers may be virtual or logical (or software based) servers that run on the same physical server.

Each server 110 may be associated with one or more sessions 112 (labeled session 1 to L, and K to M, where L, K, and M are integers) and one or more message queues 120 that operate using at least some of the server associated resources (e.g., memory and processor). The servers 110 may comprise different number of sessions 112. The session 112 may be applications or software that run on the servers 110 and communicate with the message queues 120 to process a plurality of corresponding messages, e.g., insurance claim messages. The sessions 112 and the message queues 120 may be software components that run using physical resources (e.g., memory, storage, processors) of the servers 110 or the production environment system 100. For example, the sessions 112 may be computer program or code, such as Activation Specifications in the IBM Websphere software environment, that run on the servers 110. The message queues 120 may be data structures, such as arrays, lists, or pointers, that are maintained in system memory.

Each session 112 may send and receive messages to one message queue 120. The message queue 120 may exchange the messages with the sessions 112 and with other components (not shown) that may be coupled to the production environment system 100, such as data center networks, network nodes, client system components, or combinations thereof. The message queues 120 may be configured to handle different types of messages. For example, in the healthcare insurance provider system, the message queues 120 may be associated with different types of insurance messages claims, such as dental claims and medical claims. The sessions 112 may communicate with the different message queues 120 to handle the different message types. A plurality of sessions 112, e.g., in the same server 110, may communicate with the same message queue 120.

Additionally, the production environment system 100 may comprise a workload manager (not shown) that may be configured to manage the workload of the application servers 110 to improve or optimize load balance, e.g., at any time during operations. The workload manager may be configured to redistribute the sessions 112 between the different application servers 110 and message queues 120 based on the number of sessions 112 per application server 110, the depth of the message queues 120 that may handle different amounts of data or message types, and other parameters that may be determined for the production environment system 100. The workload manager may monitor the sessions 112 and the message queues 120 and redistribute the sessions 112 among the application servers 110/accordingly in a continuous and automatic manner without manual or human intervention. The workload manager may be a software component that runs using physical resources (e.g., memory, storage, processors) of the servers 110 or the production environment system 100. For example, the workload manager may be a computer program or code (application) that runs on one or more of the servers 110 and/or on the production environment/system 100. Alternatively, the workload manager may be a separate component implemented using hardware (or both hardware and software) and configured to communicate with the other components to implement the load balance scheme.

Figure 2:
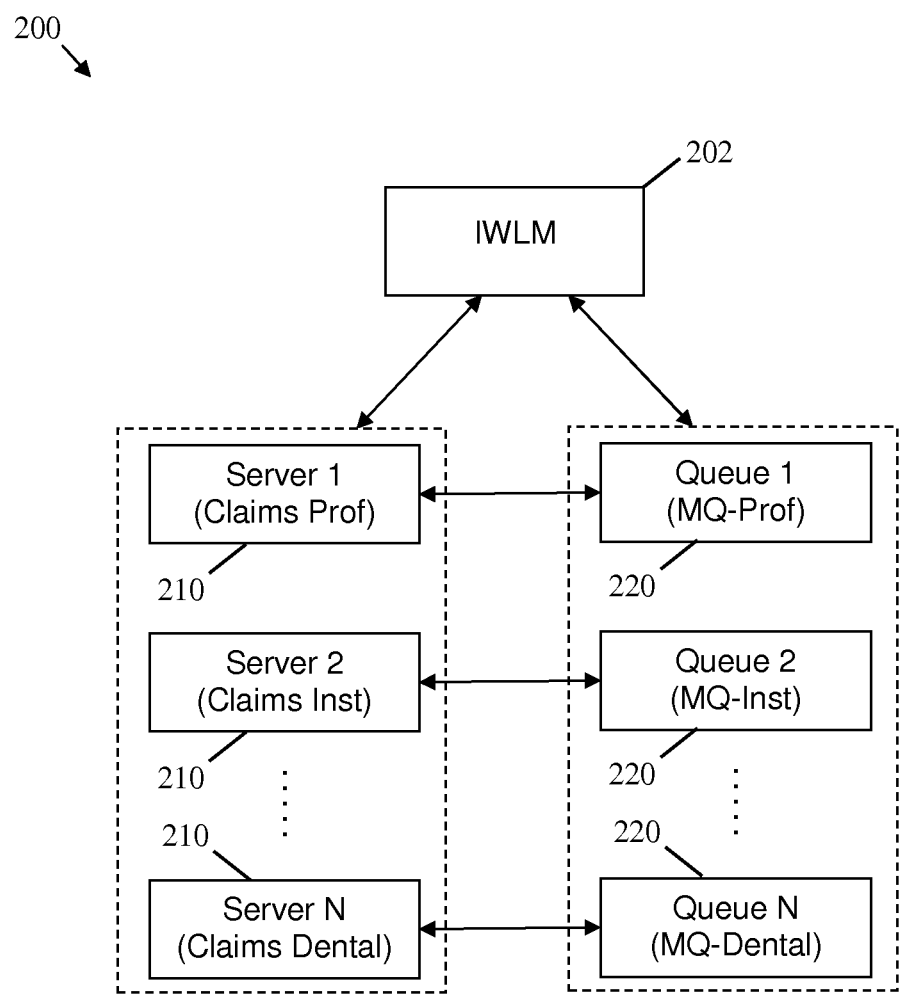
FIG. 2 is a schematic diagram of an embodiment of a load balance system.

FIG. 2 illustrates an embodiment of a load balance system 200 that may be used in a business enterprise or other message-based systems/environments, such as the production environment/system 100. The load balance system 200 may be used to achieve improved load balance (or workload distribution) in a continuous and automatic manner, e.g., any time during operations and without the need for manual or human intervention. For instance, the load balance system 200 may be used in a healthcare management system that processes different types of healthcare claims in the form of messages.

The load balance system 200 may comprise a workload manager 202, also referred to herein as an intelligent workload manager (IWLM), a plurality of application servers 210 (labeled server 1 to N, where N is an integer), and a plurality of corresponding message queues 220 (labeled queue 1 to N). The application servers 210 may run or implement a plurality of sessions (e.g., Activation Specifications) that may share system resources. The application servers 210, the sessions, and the message queues 220 may be configured similar to the application servers 110, the sessions 112, and the message queues 120, respectively. The work load manager or IWLM 202 may be configured to communicate with the application servers 210, the sessions on the application servers 210, and the queues 220 to monitor the states of the sessions and the message queues 220. The IWLM 202 may also be configured to redistribute (or move) the sessions between the application servers 210 and/or the message queues 220 if needed to improve load balance between the application servers 210, the message queues 220, other shared resources, or combinations thereof. For instance, load balance may be improved when each application server 210 is handling about the same or comparable number of sessions as other servers 210, when each message queue 220 has about the same or comparable depth as other message queues 220, or both.

The IWLM 202 may redistribute or reallocate the sessions between the application servers 210 and message queues 220 based on system conditions and configurations to maintain or improve load balance between the application servers 210 and message queues 220 and hence reduce or eliminate resource contention and improve overall system performance. For instance, the message queues 220 with more depth (more data) may be reassigned more sessions on the application servers 210. Redistributing the sessions when needed may also improve server and system resource utilization. For instance, some sessions may be reallocated from idle application servers 210 or application servers 210 with less workload, which may run more sessions than is needed, to application servers 220 with substantially more workload.

The load balance system 200 may be implemented in a healthcare management system that processes healthcare bills or claims (e.g., insurance claims). For instance, the application servers 210 may include a first server for processing institutional claims (Claims Inst), a second server for processing dental claims (Claims Dental), and a third server for processing professional claims (Claims Prof). The institutional claims may be insurance claims that are forwarded, e.g., in the form of messages (or frames) from health service provider institutions. The dental claims may be insurance claims that are forwarded (in messages or frames) from dental service providers. The professional claims may be insurance claims that are forwarded from other health service providers.

The message queues 220 may include a first queue for queuing institutional claims (MQ-Inst), a second queue for queuing dental claims (MQ-Dental), and a third queue for queuing professional claims (MQ-Prof). The professional claims server 210 may communicate with the professional claims message queue 220 and implement one or more sessions to process the professional claims. The institutional claims server 210 may communicate with the institutional claims message queue 220 and implement one or more sessions to process the institutional claims. The dental claims server 210 may communicate with the dental claims message queue 220 and implement one or more sessions to process the dental claims. The IWLM 202 may continuously or periodically monitor the three application servers 210 and the three corresponding or dedicated message queues 220 to decide whether to, and how to, redistribute the sessions between the servers 210 to handle the data in their associated message queues 220 and achieve or maintain load balance.

Figure 3:
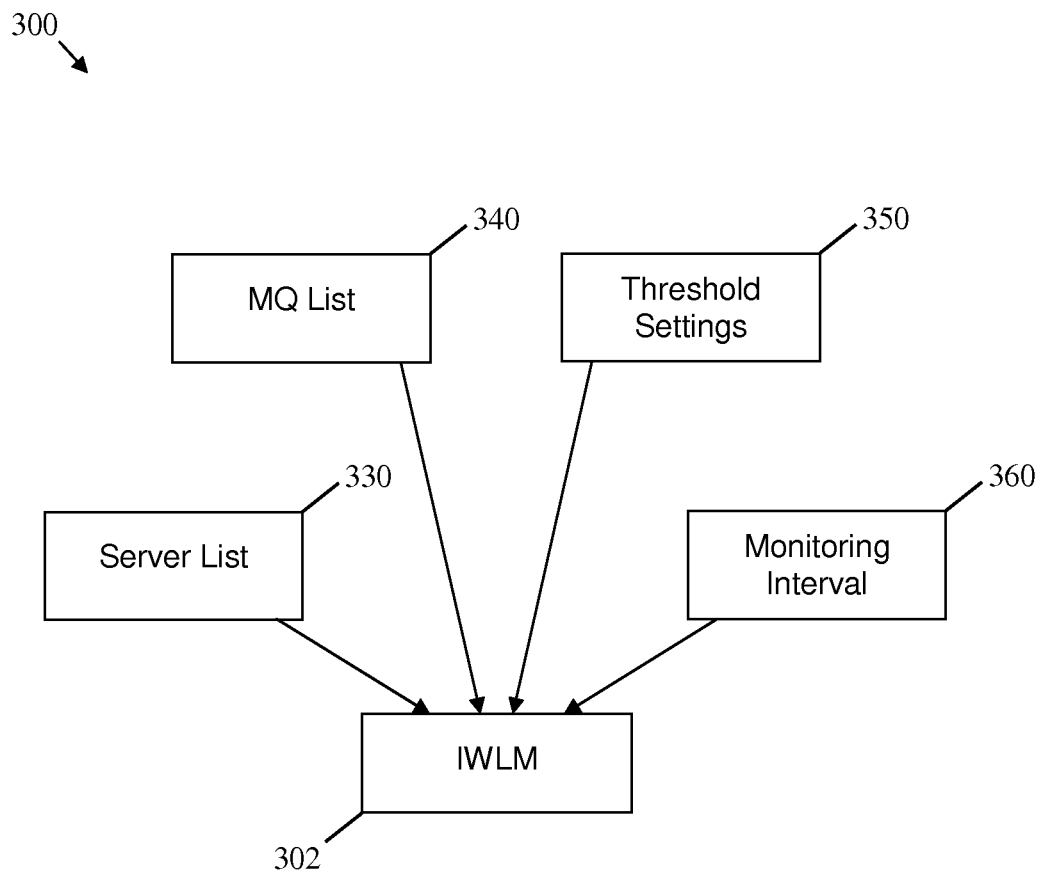
FIG. 3 is a schematic diagram of an embodiment of an intelligent workload manager (IWLM) system.

FIG. 3 illustrates an embodiment of an IWLM system 300 that may be part of the load balance system 200. The IWLM system 300 may comprise an IWLM 302, which may correspond to the IWLM 202 in the load balance system 200. The IWLM system 302 may also comprise a plurality of parameters and system settings that may be monitored and/or used by the IWLM 302 for achieving and maintaining improved load balance between application servers. The parameters and system settings of the IWLM 302 may comprise an application server list 330, a message queue (MQ) list 340, one or more threshold settings 350, and a monitoring interval 360.

The application server list 330 may include a plurality of servers, which may share the same physical box and/or computation resources. The servers in the list may include active servers that run sessions and may also include idle servers that are not currently allocated any sessions. The application server list 330 may also indicate the status of each of the servers, such as the number of sessions allocated for each server and optionally other resources allocated for each server (amount of allocated memory and processing power). The MQ list 340 may include a plurality of message queues that may communicate with the sessions to process, send, and receive messages. The queues in the list may include busy queues that comprise messages and may also include free queues that do not currently comprise messages. The MQ list 340 may also indicate the status of each of the message queues, such as the depth of each queue and optionally other resources allocated for each of the message queues (e.g., amount of allocated memory).

The monitoring interval 360 may be a determined time interval for recurring or periodic monitoring of other parameters and system settings, including the application server list 330 and the MQ list 340. For example, the monitoring interval may be a few minutes or a few seconds (e.g., less than or equal to about 10 minutes or seconds). The threshold settings 350 may comprise a plurality of determined threshold values that define tolerable or recommended system conditions for operation and maintaining acceptable load balance. The threshold settings 350 may comprise a minimum number of sessions (e.g., Activation Specifications) per application server, a maximum number of sessions per application server, a percentage (or portion) of the sessions that may be transferred between application servers at a time, a percentage (or portion) of queue depth with respect to the number of sessions (for the queue) that needs to be reached for triggering the transfer of sessions, or combinations thereof.

The IWLM 302 may monitor the number of sessions for each server and the depth of each message queue during initiation (load time) and subsequently during operation time, e.g., in a continuous or periodic manner at each subsequent monitoring interval 360. The sessions on the servers and the depth of the queues may be indicated in the server list 330 and the MQ list 340, respectively, or via other means. The IWLM 302 may use the number of sessions and the depth of the queues with the threshold settings 350 to decide whether at least some of the sessions for one or more message queues need to be reassigned to different servers, for example to idle servers or servers with less workload. The IWLM 302 may decide to redistribute or move at least some of the sessions between the servers and message queues at each subsequent monitoring interval 360 based on changes in the monitored parameters and system settings above. By redistributing the sessions based on the continuously or periodically monitored parameters and system settings, the IWLM 302 may maintain load balance during the operation time of the system. Additionally, the parameters and system settings may be changed or updated during operation time to adjust the load balance scheme to changes in the system, such as to adjust to changes in the priorities between the servers and the message queues, or to handle different scenarios.

Figure 4:
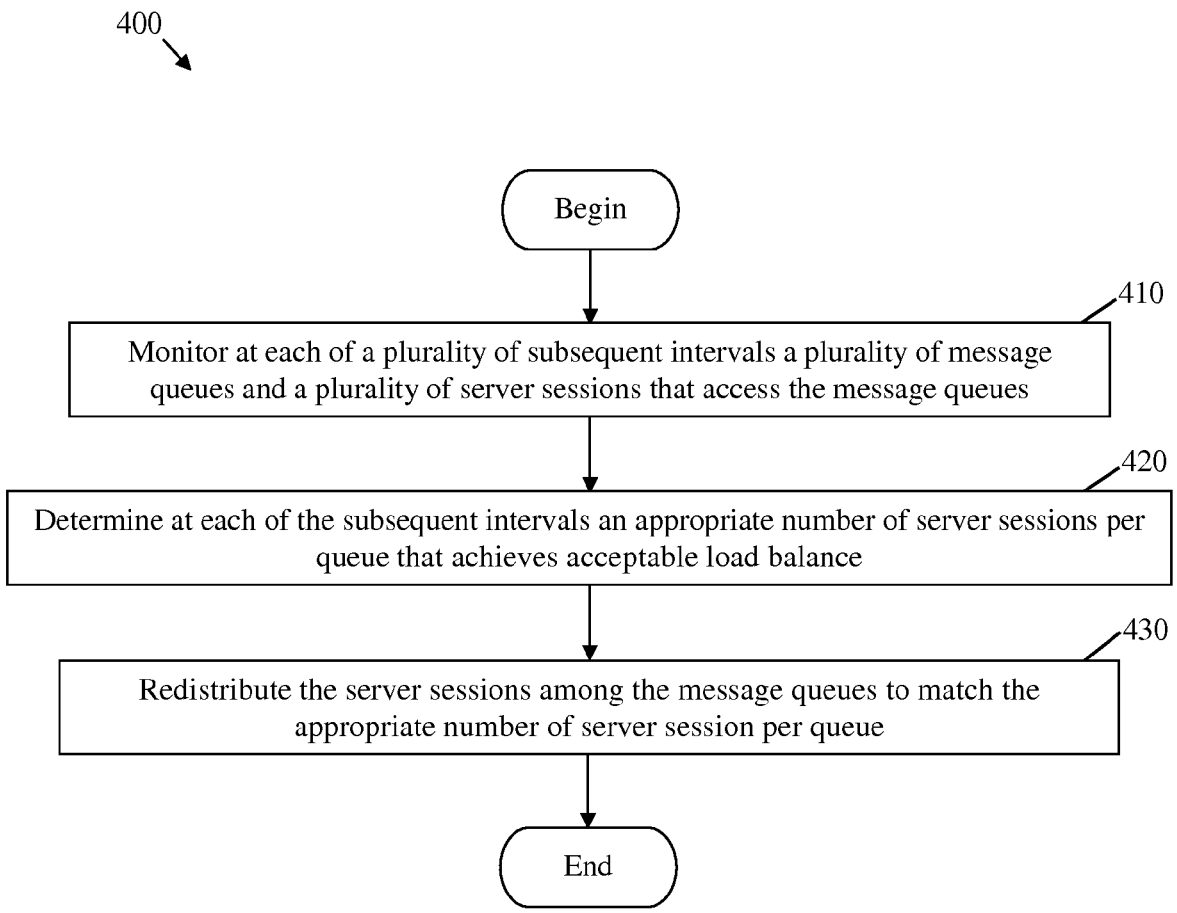
FIG. 4 is a flowchart of an embodiment of an IWLM method.

FIG. 4 illustrates an embodiment of an IWLM method 400 that may be implemented by the load balance system 200 or the IWLM system 300. The IWLM method 400 may begin at block 410, where a plurality of message queues and a plurality of server sessions that access the message queues may be monitored at each of a plurality of subsequent intervals. For instance, using a Websphere software environment, the IWLM may monitor a plurality of message queues and a plurality of Activation Specifications that access the message queues, e.g., on a plurality of servers in a physical box. At block 420, an appropriate number of server sessions per queue that achieves acceptable load balance may be determined at each of the subsequent intervals. For instance, the IWLM may determine the needed or suitable number of Activation Specification sessions for each server and/or queue, based on the current number of server sessions for each server, the depth of each message queue, determined threshold settings (e.g., the threshold setting 350), and optionally other system/resource conditions. At block 430, the server sessions may be redistributed among the message queues to match the appropriate number of server session per queue. The IWLM may maintain the current server sessions at the servers or move at least some of the server sessions between the servers to match the determined appropriate number of server sessions per server/queue. For instance, the IWLM may use Java Management Extensions (JMX), which is a suite of software tools or functions in the Websphere environment, to change the distribution of the Activation Specifications among the servers/queues. The method 400 may then end. The IWLM method 400 may promote effective usage of resources for application servers, and thus improve throughput. This may benefit end users of the system in terms of faster processing time.

In an embodiment, the IWLM (e.g., the IWLM 202) may use an IWLM configuration to decide whether and how to redistribute at least some of the sessions between the servers (e.g., the servers 210) and message queues (e.g., the message queues 220) and optionally other system resources. The IWLM configuration may comprise at least some of parameters and system settings of the IWLM system 300. The IWLM configuration may be used to reconfigure the sessions and achieve acceptable load balance in the system. The IWLM may monitor (e.g., periodically) the quantity of sessions on each server and the amount of data or depth of each message queue to verify that the distribution of sessions on the servers and the association of sessions with the message queues are acceptable according to the IWLM configuration. Otherwise, the IWLM may redistribute the sessions based on the IWLM configuration to improve load balance. Table 1 shows an example of the IWLM configuration that may be established to guarantee load balance.

TABLE 1

Example of an IWLM configuration

| Configuration | Value |
| --- | --- |
| Servers to be monitored | 3 |
| MQs to be monitored | 3 |
| Monitoring interval | 5 minutes |
| Maximum Activation Specifications | 75 |
| Minimum Activation Specification | 25 |
| % of Queue Depth | 20 |
| % of Activation Specification to be transferred | 100% (or configurable) |

The IWLM configuration may indicate a number of servers to be monitored, a number of message queues to be monitored, a monitoring interval for the IWLM, a maximum number of sessions (e.g., Activation Specifications) per server, a minimum number of sessions per server, a percentage (%) for queue depth, and a percentage for sessions to be transferred. The number of servers to be monitored may reflect the total number of servers that may be active (e.g., that run the sessions for processing the message queues). The number of message queues may reflect the total number of message queues that may be active (e.g., that comprise messages or data). The monitoring interval may be the recurring or periodic interval for monitoring the sessions in the servers and the depth of the message queues. The maximum number of sessions may be the recommended maximum number of sessions that may be moved per server in each request. The minimum number of sessions may be the recommended minimum number of sessions that may be retained per server. The percentage of queue depth may be the minimum recommended or threshold percentage of queue depth with respect to the number of sessions associated with the queue. If this threshold is reached, then the queue is deemed busy. Otherwise, the queue is considered relatively lightly loaded. The percentage for sessions to be transferred may be the maximum percentage of sessions per server that may be transferred or moved at one instance.

In an example, the IWLM configuration may indicate three servers and three message queues to be monitored. The three servers may include a first server for processing institutional claims, a second server for processing professional claims, and a third server for processing dental claims. The three servers may communicate with three corresponding (e.g., dedicated) message queues, including a first message queue for queuing institutional claims, a second message queue for queuing professional claims, and a third message queue for queuing dental claims. The IWLM may monitor the queue depth for each of the three message queues and the number of sessions implemented on each of the three servers at each recurring monitoring interval, e.g., at about each five minutes.

The monitored queue depth for each message queue and corresponding number of allocated sessions per server may be used to calculate the percentage of queue depth with respect to the allocated session per queue, which may then be compared to the percentage for queue depth indicated in the IWLM configuration. The monitored number of sessions for each server may also be compared to the minimum number of sessions per server, as indicated by the IWLM configuration. Based on these parameters, the IWLM may decide which server(s) and corresponding message queues to and from which to move the sessions. The IWLM may also determine a number of sessions to be moved according to the indicated percentage for sessions to be transferred in the IWLM configuration. The percentage for sessions to be transferred in the IWLM configuration may be changed (e.g., during operation time), e.g., reduced from 100% if needed. Other values or parameters in the IWLM configuration may also be changed to update the IWLM configuration if needed, e.g., based on changing system conditions or optimization objectives. The IWLM configurations may be updated during operation time (run time), which may allow more flexibility and provide dynamic load balancing.

For example, in a first scenario that corresponds to a healthcare management system, each of three servers (a first server for institutional claims, a second server for professional claims, and a third server for dental claims) may implement or run about 100 sessions (e.g., Activation Specifications) before the IWLM's monitoring interval. The IWLM may use the monitoring interval and the other IWLM parameters indicated in the IWLM configuration of Table 1. The queue depth of a first queue (for institutional claims) associated with the first server may be about 10 messages. The queue depth of a second queue (for professional claims) associated with the second server may be about 2000 messages. The queue depth of a third queue (for dental claims) associated with the third server may be about 10 messages. At the IWLM's monitoring interval, the IWLM may decide to move some of the sessions from the servers corresponding to the message queues with smaller depth (for institutional and dental claims) to the server corresponding to the message queue with substantially higher depth (for professional claims). Since each of the institutional claims server and the dental claims server has less than the indicated percentage of queue depth with respect to the number of associated sessions (10/100 is equal to 10%, which is less than 20%), the IWLM may reduce the sessions for each of the institutional claims server and the dental claims server to the recommended minimum (25 sessions). The number of total removed sessions from both the institutional claims server and the dental claims server (75 removed sessions from each) may be reassigned to the professional claims server. As such, after the monitoring interval, the professional claims server may be assigned about 250 sessions (100 original sessions and 150 additional transferred sessions), and each of the institutional claims server and dental claims server may be allocated about 25 sessions.

In a second scenario, each of the three servers may also implement or run about 100 sessions (e.g., Activation Specifications) before the IWLM's monitoring interval. The IWLM may use the monitoring interval and the other IWLM parameters indicated in the IWLM configuration of Table 1. The queue depth for the first queue (for institutional claims) may be about 1000 messages, the queue depth for the second queue (for professional claims) may be about 2000 messages, and the queue depth for the third queue (for dental claims) may be about 500 messages. At the IWLM's monitoring interval, the IWLM may decide not to move any sessions between the servers since all the servers may be busy servicing a substantial depth of the corresponding queues, where the percentage of queue depth for each of the queues exceeds the indicated percentage of queue depth in the IWLM configuration.

In some embodiments, the IWLM configuration may be used to manage (maintain/redistribute) the sessions on the servers and message queues under one or more IWLM constraints, which may be imposed due to system limitations. For instance, in the Websphere software environment, the IWLM configuration above may be implemented on the condition that both the WMQJCAResourceAdapter thread pool and the maximum Java Virtual Machine (JVM) memory size support the maximum number of Activation Specifications indicated in the IWLM configuration.

Figure 5:
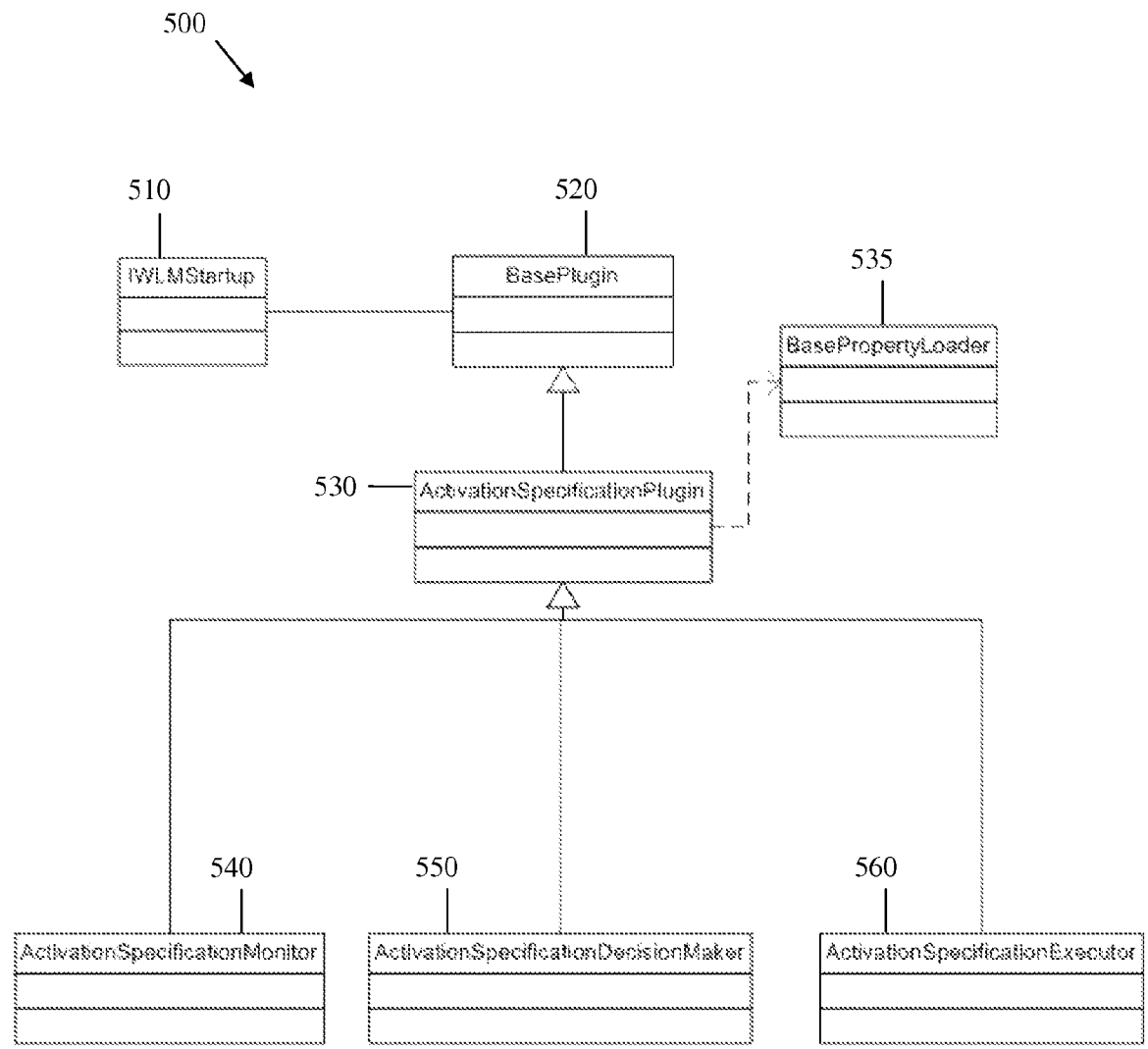
FIG. 5 is a schematic diagram of an embodiment of an IWLM system design.

FIG. 5 illustrates an embodiment of an IWLM system design 500 that may be implemented in the Websphere software environment. The IWLM system design 500 may comprise a plurality of blocks that represent software components, such as classes, functions, and/or procedures. The blocks may comprise an IWLMStartup block 510, a BasePlugin block 520, an ActivationSpecificationPlugin block 530, a BasePropertyLoader block 535, an ActivationSpecificationMonitor block 540, an ActivationSpecificationDecisionMaker block 550, and an ActivationSpecificationExecutor block 560. The blocks may be coupled to each other and hence communicate with each other as shown in FIG. 5.

The IWLMStartup block 510 may be a startup class that has the functionality at startup of providing a mechanism for loading modules as plugins based on the jars. The IWLMStartup block 510 may also have the functionality at startup of providing a shutdown hook to recursively call the modules to revert to the original/initial state of the application servers. The BasePlugin block 520 may be a plugin class that defines the methods initializePlugin( ), startPlugin( ), and shutdownPlugin( ). The method initializePlugin( ) may be a plugin that provides a basic MBean mechanism for the concrete implementations. This plugin may also include concrete classes that provide the initialization steps as deemed necessary for this plugin, and may provide the mechanism to persist the initial settings to revert during shutdown. The method startPlugin( ) may be a plugin that provides the threading facility for starting the plugin asynchronously. This plugin may also include a concrete class that may be responsible for providing the execution mechanism. The method shutdownPlugin( ) may include a concrete class that implements the decision of shutting down gracefully.

The BasePropertyLoader block 535 may be a class configured for reading a property file for configuration and providing a key-value pair. The ActivationSpecificationPlugin block 530 may be a class that extends the BasePlugin block 520 or class. The class may provide the methods initialize( ) startPlugin( ) and shutdownPlugin( ) The method initialize( ) may be configured to read the property file for the configuration and set the values for a monitoring agent. The method startPlugin( ) may create a Monitor instance, a DecisionMaker instance, and an Executor instance. This method may act as a mediator instance that may enable interaction between the Monitor instance, the DecisionMaker instance, and the Executor instance. The method shutdownPlugin( ) may change the state of the application servers to an initial state.

The ActivationSpecificationMonitor block 540 may be a class that provides a mechanism to monitor the Activation Specification server sessions and MQ depth. This class may comprise the method monitor( ). The method monitor( ) may monitor Activation Specification server sessions and MQ depth, and may update the current state and initiate the plugin (ActivationSpecificationPlugin block 530) when the results are available.

The ActivationSpecificationDecisionMaker block 550 may be a class configured to decide on the action to be taken based on the current monitored value and the previous monitored value. This class may intimate the result to the plugin (ActivationSpecificationPlugin block 530), which may then communicate this information to an ActivationSpecificationExecutor instance. The ActivationSpecificationExecutor block 560 may be a class configured to change the Activation Specifications (per server) to the value communicated by the plugin (ActivationSpecificationPlugin block 530).

The IWLM system design 500 may be implemented by an IWLM component (e.g., the IWLM 202) and may include a plurality of design patterns, including a plugin based design for loading different monitoring modules, and a concrete plugin configured as a Mediator for interaction between the Monitor, DecisionMaker, and Executor instances, and thus implements a Mediator pattern.

Figure 6:
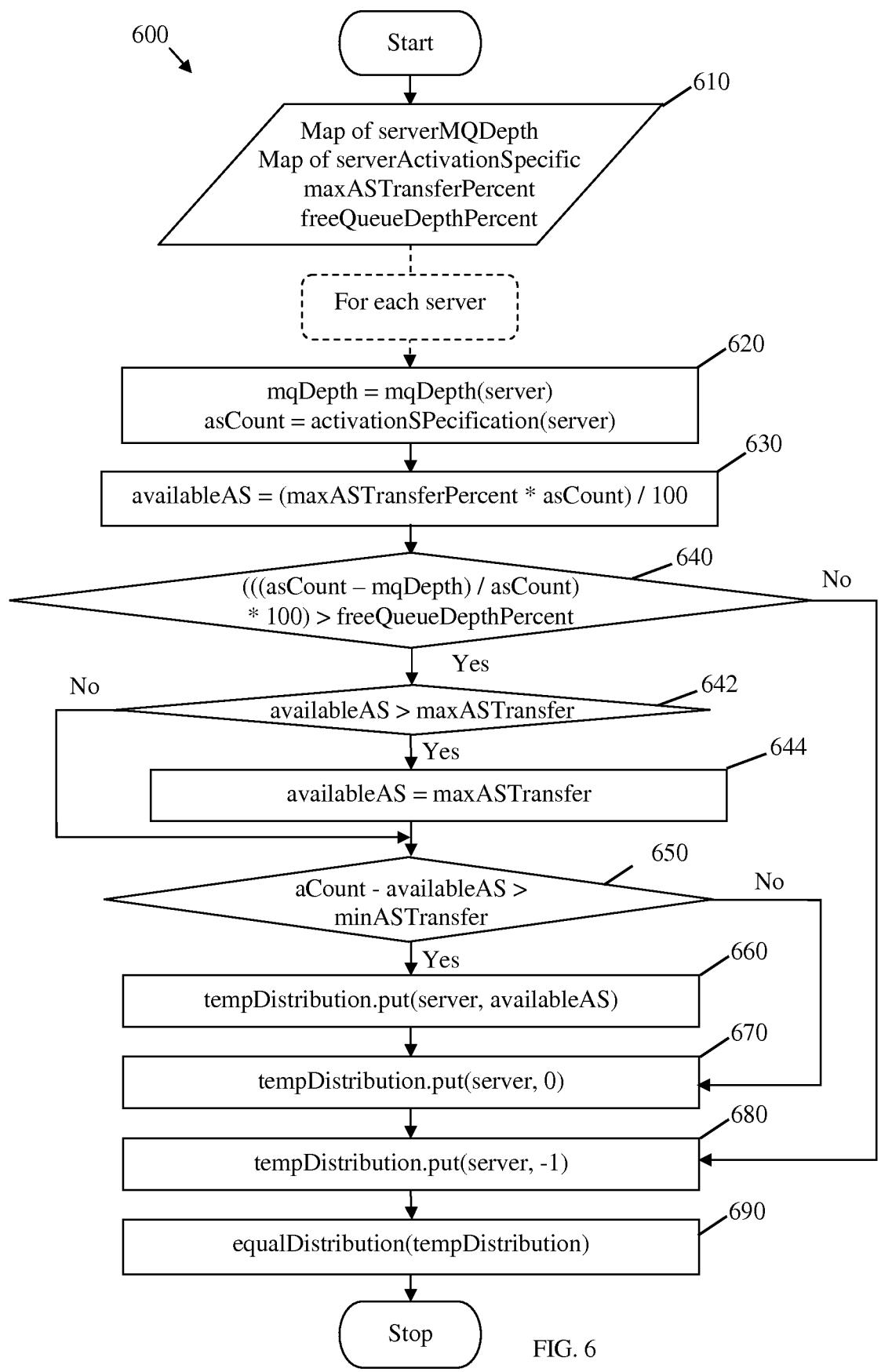
FIG. 6 is a flowchart of an embodiment of an IWLM decision making method.

FIG. 6 illustrates an embodiment of an IWLM decision making method 600 that may be implemented at the ActivationSpecificationDecisionMaker block 550. The method 600 may start at block 610, where a plurality of parameters may be obtained. The parameters may be IWLM configurations parameters, as described above. The configuration parameters may comprise a list of queue depth (Map of serverMQDepth) for each queue associated with a server (e.g., in a one to one association between the queues and servers). The configuration parameters may comprise a list of sessions (or Activation Specifications) per server (Map of serverActivationSpecific). The configuration parameters may comprise a percentage of sessions that may be transferred in one instance (maxASTransferPercent). The configuration parameters may also comprise a threshold percentage of queue depth per queue (freeQueueDepthPercent). The remaining blocks of the methods 600 may be implemented for each server and associated queue.

At block 620, the message queue depth (mqDepth) and the number of sessions or Activation Specifications (asCount) may be obtained per server. This is represented by the following equations: mqDepth=mqDepth(server), and asCount=activationSPecification(server). At block 630, the number of sessions available for transfer (availableAS) per server may be determined based on maxASTransferPercent and asCount, such as availableAS= (maxASTransferPercent*asCount)/100. At block 640, the method 600 may determine whether the percentage of queue depth per server (of associated queue) is less than freeQueueDepthPercent, e.g., using the equation (((asCount−mqDepth)/asCount)*100)>freeQueueDepthPercent. If the condition in block 640 is true, then the method 600 may proceed to block 642. Otherwise, the method 600 may proceed to block 680. At block 642, the method 600 may determine whether availableAS is greater than maxASTranfer. If the condition in block 642 is true, then the method 600 may proceed to block 644. Otherwise, the method 600 may proceed to block 650. At block 644, availableAS may be set equal to maxASTranfer.

At block 650, the method 600 may determine whether asCount−availableAS is greater than a determined minimum allowed of sessions to be kept per server, minASTransfer. If the condition in block 650 is true, then the method 600 may proceed to block 660. Otherwise, the method 600 may proceed to block 670. At block 660, the method 600 may decide to move a number of sessions for the server under consideration that is equal to availableAS. The sessions to be transferred may be allocated using the function tempDistribution.put(server, availableAS). At block 670, the method 600 may decide not to move any session from the server under consideration. This may be implemented using the function tempDistribution.put(server, 0). At block 680, the method 600 may decide that the server under consideration needs additional sessions that are to be moved from other servers. This may be implemented using the function tempDistribution.put(server, −1). At block 690, the method 600 may consolidate all the sessions that are to be transferred between all the servers to achieve, improve, or maintain load balance. This may be implemented using the function equalDistribution(tempDistribution). The method 600 may then end.

Figure 7:
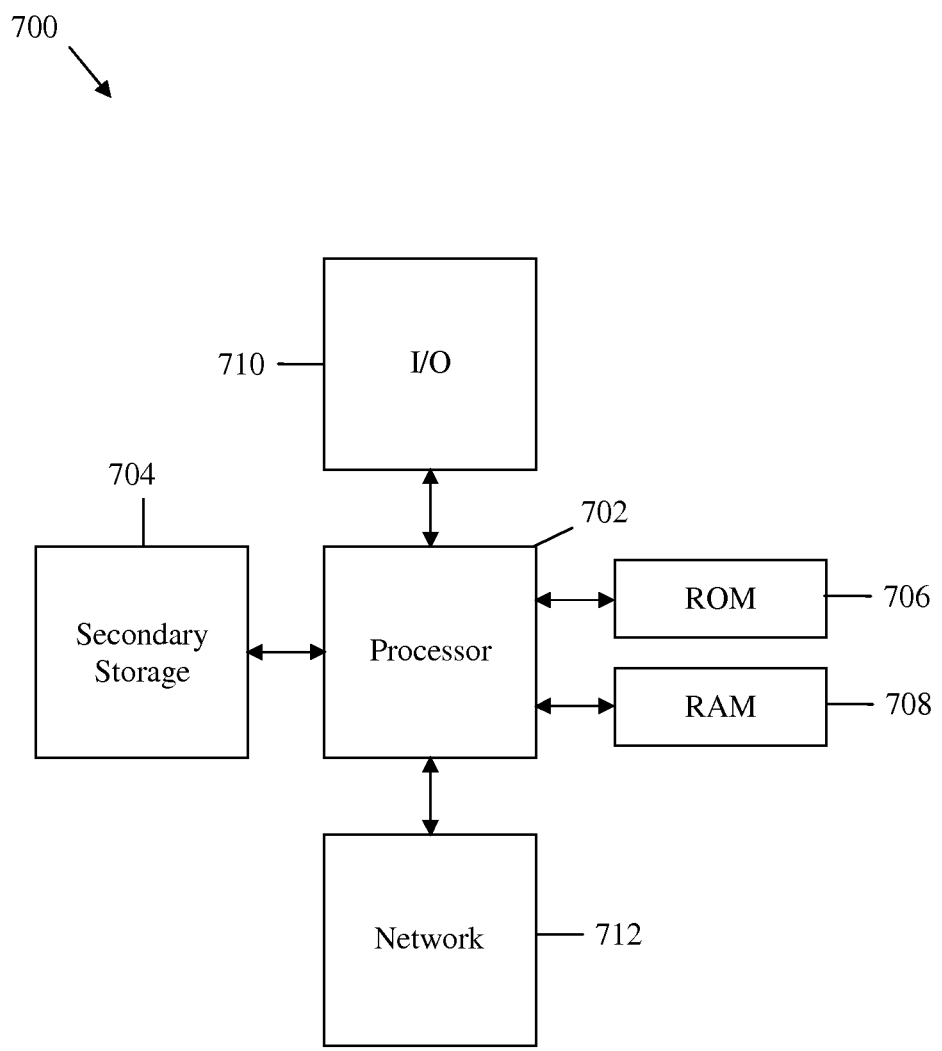
FIG. 7 is a schematic diagram of an embodiment of a general-purpose computer system.

The components described above may be implemented on any general-purpose network component, such as a computer or mobile device with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702, e.g., a central processing unit (CPU), which is in communication with memory devices including secondary storage 704, read only memory (ROM) 706, random access memory (RAM) 708, input/output (I/O) devices 710, and network connectivity devices 712. The processor 702 may be implemented as one or more central processing unit (CPU) chips, or may be part of one or more application specific integrated circuits (ASICs) and/or digital signal processors (DSPs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 7, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 7 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means+10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A management system for processing message-based communications comprising:
    a plurality of servers configured to implement a plurality of sessions that process a plurality of messages;
    a plurality of message queues coupled to the servers and configured to exchange the messages with the servers; and
    a workload manager coupled to the servers and the message queues and configured to reallocate the sessions to the different servers and the corresponding message queues to achieve load balance between the servers and the message queues in a recurring manner during processing of the messages by the servers based on a depth of each of the message queues, a quantity of sessions for each of the servers, and a workload manager configuration, wherein the workload manager configuration indicates a threshold percentage of queue depth per queue with respect to the quantity of sessions associated with the queue that triggers a redistribution of sessions if reached.

2. The management system of claim 1, wherein the workload manager configuration is updatable during processing of the sessions by the servers.

3. The management system of claim 1, wherein the workload manager configuration further indicates a list of the servers and a list of the message queues to be monitored.

4. The management system of claim 1, wherein the workload manager configuration further indicates a recurring monitoring interval for assessing the depth of each of the message queues and the quantity of sessions for each of the servers to determine the allocation of the sessions.

5. The management system of claim 1, wherein the workload manager configuration further indicates a recommended maximum number of sessions for transfer per server and a recommended minimum number of sessions that are kept per server.

6. The management system of claim 1, wherein the workload manager configuration further indicates a percentage of sessions that is allowed to be transferred per server in one instance.

7. The management system of claim 1, wherein the messages comprise a plurality of healthcare institutional claims, a plurality of healthcare professional claims, and a plurality of healthcare dental claims, wherein the servers comprise a first server for processing the healthcare institutional claims, a second server for processing the healthcare professional claims, and a third server for processing the healthcare dental claims, and wherein the message queues comprise a first queue associated with the first server and the healthcare institutional claims, a second queue associated with the second server and the healthcare professional claims, and a third queue associated with the third server and the healthcare dental claims.

8. An application for healthcare claims management comprising a plurality of instructions that cause a processor to:
    obtain a plurality of parameters including a server list, a message queue list, a plurality of threshold settings, and a monitoring interval, wherein the threshold settings comprise a recommended minimum number of sessions to be allocated per server, a recommended maximum number of sessions for transfer per server, a percentage of the sessions that is allowed for transfer at one instance between servers, and a percentage of queue depth that when reached triggers a transfer of the sessions;

monitor a plurality of servers indicated in the server list and a plurality of message queues coupled to the servers and indicated in the message queue list at each recurring monitoring interval; and reallocate a plurality of sessions implemented on the servers and associated with the message queues based on the quantity of sessions on each of the servers, the depth of each of the message queues, and the threshold settings.

9. The application of claim 8, wherein the instructions further cause the processor to move a plurality of sessions of a monitored queue if a percentage of the depth of the monitored queue with respect to a number of sessions associated with the monitored queue is less than or about equal to the percentage of queue depth of the threshold settings.

10. The application of claim 9, wherein the relation (((asCount−mqDepth)/asCount)*100)>freeQueueDepthPercent is used to determine whether to move the sessions, where asCount is the number of sessions, mqDepth is the depth of the monitored queue, and freeQueueDepthPercent is the percentage of queue depth of the threshold settings.

11. The application of claim 9, wherein the instructions further cause the processor to move the sessions of a monitored server that is associated with the monitored queue if the product of a number of sessions on the monitored server and the percentage of the sessions that is allowed for transfer at one instance between servers is greater than a determined maximum allowed number of sessions for transfer per server.

12. The application of claim 11, wherein the relation aCount−availableAS>minASTransfer is used to determine whether to move the sessions, where availableAS= (maxASTransferPercent*asCount)/100, maxASTransferPercent is the percentage of the sessions that is allowed for transfer at one instance between servers, and asCount is the number of sessions on the monitored server.

13. The application of claim 9, wherein the instructions further cause the processor to move a plurality of sessions from one or more first monitored servers to a second monitored server if a percent of the depth of a monitored queue associated with the second server with respect to a number of sessions associated with the monitored queue is greater than or about equal to the percentage of queue depth of the threshold settings.

* * * * *